(No Model.)

G. N. POLHEMUS.
THILL COUPLING BOLT.

No. 574,569. Patented Jan. 5, 1897.

WITNESSES:
C. B. Larson
E. Gerst

INVENTOR
Garrett N. Polhemus
BY
Edgar Tate & Co.
ATTORNEYS.

UNITED STATES PATENT OFFICE.

GARRETT NEVINS POLHEMUS, OF FRANKLIN PARK, NEW JERSEY.

THILL-COUPLING BOLT.

SPECIFICATION forming part of Letters Patent No. 574,569, dated January 5, 1897.

Application filed April 15, 1896. Serial No. 587,635. (No model.)

*To all whom it may concern:*

Be it known that I, GARRETT NEVINS POLHEMUS, a citizen of the United States, and a resident of Franklin Park, in the county of Somerset and State of New Jersey, have invented certain new and useful Improvements in Means for Connecting the Shafts with Vehicles, of which the following is a specification, reference being had to the accompanying drawings, forming a part thereof, in which similar letters of reference indicate corresponding parts.

This invention relates to means for connecting the shafts of a vehicle therewith; and the object thereof is to provide a simple and effective device of this class for connecting shafts with carriages, trucks, and other vehicles, and also for connecting the poles or tongues with vehicles; and with this and other objects in view the invention consists in the construction, combination, and arrangement of parts hereinafter described and claimed.

The invention is fully disclosed in the following specification, of which the accompanying drawings form a part, in which—

Figure 1:
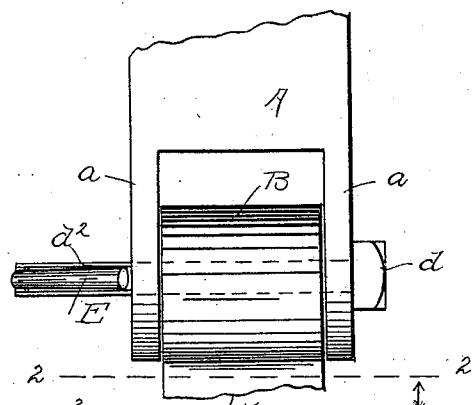
Figure 2:
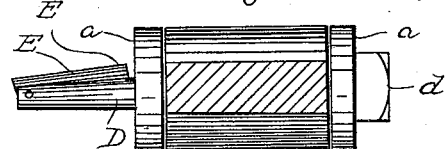
Figure 3:
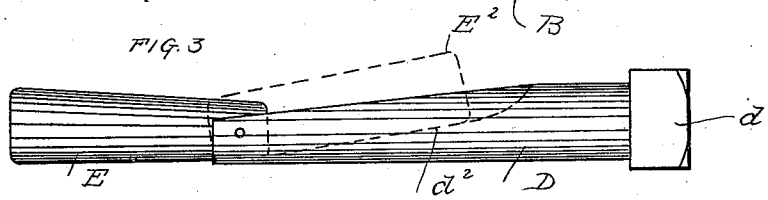
Figure 4:
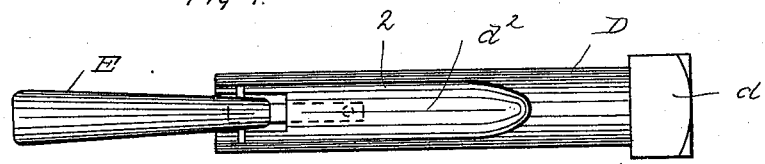

Figure 1 is a plan view of the head of one side of a pair of shafts and of the arm by which it is connected with the axle of a vehicle; Fig. 2, a section on the line 2 2; Fig. 3, a side view of the coupling pin or bolt which I employ; Fig. 4, a plan view thereof, and Fig. 5 a central vertical longitudinal section of a part thereof.

In the drawings forming part of this specification, A represents one of the arms or bars which is connected with the axle or truck of a carriage or other vehicle and to which the shafts are connected, and said arm or bar is provided with jaws $a$, which are provided with side openings, through which a pivot or coupling pin is passed, and B represents the head of one of the shafts which is mounted between said jaws $a$, the shaft being broken away at $b$; and in the practice of my invention I provide a coupling pin or bolt D, having a head $d$, and the end thereof opposite the head is provided with a groove $d^2$, which is semicircular in cross-section, and which extends to the end of the coupling-pin opposite the head and along the side thereof for about two-thirds or three-fourths of its length, said groove gradually growing shallower from the end of the bolt in the direction of the head, as shown in full lines in Fig. 4 and in dotted lines in Fig. 3.

Figure 5:
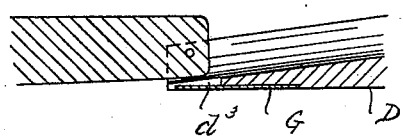

The end of the coupling pin or bolt is also provided at the bottom of the groove $d^2$ with an angular opening or recess $d^3$, and pivoted in said groove, at or near the end thereof, is a supplemental locking plug or bolt E, the free end of which is larger than the pivoted end, and said locking bolt or pin is adapted to be folded back into the groove $d^2$, as shown in Figs. 1, 2, and 3, and in this position it is held by a spring G, which is secured to the lower side of the locking pin or bolt D, and which projects over the angular opening or recess $d^3$, as clearly shown in Figs. 4 and 5.

The pivoted end of the supplemental locking bolt or plug E is slightly oblong and angular in cross-section, and when turned from one position to another the corners and the end thereof strike on the spring G, and when extended, as shown in full lines in Figs. 3 and 4, the spring presses on the bottom thereof, and when folded back, as shown in full lines in Figs. 1 and 2 the said spring G presses on the bottom thereof and holds it in said position.

The operation will be readily understood from the foregoing description, when taken in connection with the accompanying drawings and the following statement thereof.

All that is necessary in order to connect the shaft or shafts with the arms or bars A is to insert the head or heads B thereof between the jaws $a$ and then pass the coupling pin or bolt therethrough and fold the supplemental locking plug or bolt back, as shown in Figs. 1 and 2, and in dotted lines in Fig. 3. In this position the supplemental plug or bolt E is held by the spring G, and the coupling pin or bolt D cannot be withdrawn by reason of the fact that the end of the plug or bolt E projects above the side of the coupling pin or bolt, as shown at $E^2$.

Whenever it is desired to detach the shafts from the vehicle, it is only necessary to turn the supplemental plug or bolt E backwardly into the position shown in full lines in Fig. 3, when the coupling pin or bolt D may be withdrawn.

It will be apparent that this device may be used in many other relations and for many other purposes in addition to those herein described, and my invention is not limited to the application of the coupling pin or bolt, and I reserve the right to make all such alterations therein and modifications thereof as fairly come within the scope of the invention.

Having fully described my invention, I claim as new and desire to secure by Letters Patent—

The herein-described coupling pin or bolt D having a head $d$, and having formed in the shank thereof a groove $d^2$ semicircular in cross-section, and which extends to the end of the coupling-pin opposite the head, nearly the entire length thereof, and said groove growing shallower toward the head of the bolt, and said bolt being provided also with an angular opening or recess $d^3$, in which is pivoted a locking-plug E, the free end of which is larger than the pivoted end, said plug being adapted to be folded backwardly into the groove $d^2$, and being held in position by the spring G, which is secured to the lower side of the pin or bolt D, all constructed and designed to operate as herein set forth and described.

In testimony that I claim the foregoing as my invention I have signed my name, in presence of the subscribing witnesses, this 23d day of March, 1896.

GARRETT NEVINS POLHEMUS.

Witnesses:
C. C. LOGAN,
ELIZABETH LOGAN.